(12) United States Patent
Benicewicz et al.

(10) Patent No.: US 9,249,250 B2
(45) Date of Patent: Feb. 2, 2016

(54) BUTADIENE-DERIVED POLYMERS GRAFTED NANOPARTICLES AND THEIR METHODS OF MANUFACTURE AND USE

(71) Applicant: University of South Carolina, Columbia, SC (US)

(72) Inventors: Brian Benicewicz, Columbia, SC (US); Lei Wang, Columbia, SC (US); Mohammad Mohammadkhani, Columbia, SC (US)

(73) Assignee: University of South Carolina, Columbia, SC (US)

( * ) Notice: Subject to any disclaimer, the term of this patent is extended or adjusted under 35 U.S.C. 154(b) by 0 days.

(21) Appl. No.: 14/597,494

(22) Filed: Jan. 15, 2015

(65) Prior Publication Data

US 2015/0197593 A1    Jul. 16, 2015

Related U.S. Application Data

(60) Provisional application No. 61/927,520, filed on Jan. 15, 2014.

(51) Int. Cl.
C08F 292/00 (2006.01)
C08L 23/02 (2006.01)
C08L 51/10 (2006.01)

(52) U.S. Cl.
CPC .............. *C08F 292/00* (2013.01); *C08L 23/02* (2013.01); *C08L 51/10* (2013.01)

(58) Field of Classification Search
CPC ........ C08F 292/00; C08L 23/02; C08L 51/10
USPC .............. 526/335, 194, 222, 201, 226, 90, 95
See application file for complete search history.

(56) References Cited

U.S. PATENT DOCUMENTS

2003/0199653 A1* 10/2003 McCormick, III ..... B82Y 30/00
526/219.6
2012/0277378 A1* 11/2012 Nelson ................... B82Y 30/00
525/65

* cited by examiner

*Primary Examiner* — Kelechi Egwim

(57) ABSTRACT

Methods for of synthesizing a polymer functionalized nanoparticle are provided. The method can comprise: attaching an anchoring compound to a nanoparticle; attaching a RAFT agent to the anchoring compound; and polymerizing a plurality of butadiene-derived monomers on the anchoring compound to form a polymeric chain covalently bonded to the nanoparticle via the anchoring compound. Polymer functionalized nanoparticles are also provided that include a nanoparticle defining a surface; a butadiene-derived polymeric chain covalently bonded to the surface of the nanoparticle. Nanocomposites are also provided that include a plurality of such polymer functionalized nanoparticles dispersed within a polymeric matrix.

19 Claims, 2 Drawing Sheets

BUTADIENE-DERIVED POLYMERS GRAFTED NANOPARTICLES AND THEIR METHODS OF MANUFACTURE AND USE

PRIORITY INFORMATION

The present application claims priority to U.S. Provisional Patent Application Ser. No. 61/927,520 titled "Butadiene-Derived Polymers Grafted Nanoparticles and Their Methods of Manufacture and Use" of Benicewicz, et al. filed on Jan. 15, 2014, the disclosure of which is incorporated by reference herein.

BACKGROUND

Polyisoprene has been recognized as an important class of rubber materials for the automotive industry since its first application in 1917. It contains many double bonds in the polymer backbone, which allows further functionalization or chemical modifications. Polyisoprene has been prepared by anionic, cationic, and radical polymerizations. Few people have reported the polymerization of isoprene or other related butadiene-based monomers in a controlled manner.

The properties of rubber materials can be adjusted through the inclusion of inorganic nanoparticles, such as silica nanoparticles. However, the incompatibility between inorganic nanoparticles and an organic matrix normally leads to large agglomerates of the inorganic nanoparticles within the polymer matrix.

As such, a need exists for improved rubber-based nanocomposites with good dispersion of nanoparticles at both high and low nanoparticle loading.

SUMMARY

Objects and advantages of the invention will be set forth in part in the following description, or may be obvious from the description, or may be learned through practice of the invention.

Methods are generally provided for of synthesizing a polymer functionalized nanoparticle. In one embodiment, the method comprises: attaching an anchoring compound to a nanoparticle; attaching a RAFT agent to the anchoring compound; and polymerizing a plurality of monomers on the anchoring compound to form a polymeric chain covalently bonded to the nanoparticle via the anchoring compound. Thereafter, the polymeric chain can be deactivating.

The plurality of monomers generally comprises butadiene-derived monomers. For example, the butadiene-derived monomers can have the structure:

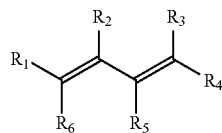

where $R_1$, $R_2$, $R_3$, $R_4$, $R_5$, and $R_6$ are, independently, H, an alkyl group, a halogen, an aromatic group, an hydroxyl group, an ether group, or another suitable organic group. In particular embodiments, the butadiene-derived monomers comprise butadiene, isoprene, chloroprene, 1,1,2-trichlorobutadiene, 2,3-dimethylbutadiene, 1,3-pentadiene, 2-acetoxy butadiene, or mixtures thereof. In some embodiments, the plurality of monomers further comprises co-monomers.

In certain embodiments, polymerization is performed at a reaction temperature of about 60° C. to about 140° C., and can be achieved via RAFT polymerization. Polymerization can be performed at a reaction conditions (e.g., reaction pressure and/or reaction temperature) that is sufficient to keep a majority of the plurality of monomer in the liquid state.

The nanoparticle can comprise an inorganic nanoparticle (e.g., silica, alumina, titania, indium tin oxide, CdSe, or mixtures thereof) or an organic nanoparticle (e.g., polymer nanoparticles, carbon, graphite, graphene, carbon nanotubes, virus nanoparticles, or mixtures thereof).

The anchoring compound can be covalently bonded to the surface of the nanoparticle directly, or can be covalently bonded to the surface of the nanoparticle via a functionalization group (e.g., an amine functional group).

Polymer functionalized nanoparticles are also generally provided that can include, in particular embodiments, a nanoparticle defining a surface; a butadiene-derived polymeric chain covalently bonded to the surface of the nanoparticle. Nanocomposites are also generally provided that include a plurality of such polymer functionalized nanoparticles dispersed within a polymeric matrix (e.g., a polyolefin or a polymeric rubber material).

Other features and aspects of the present invention are discussed in greater detail below.

BRIEF DESCRIPTION OF THE DRAWINGS

A full and enabling disclosure of the present invention, including the best mode thereof to one skilled in the art, is set forth more particularly in the remainder of the specification, which includes reference to the accompanying figures.

DEFINITIONS

Figure 1A:
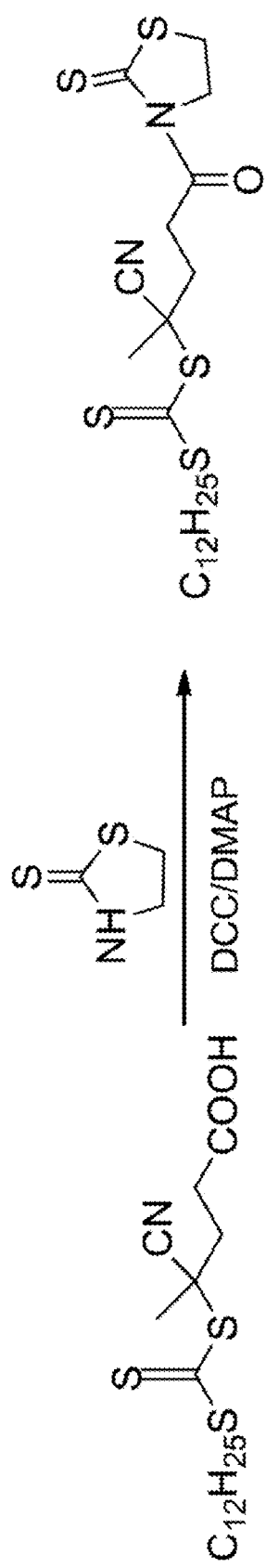
FIG. 1A shows a reaction illustration of an exemplary method of formation of a trithiocarbonate RAFT agent.

Chemical elements are discussed in the present disclosure using their common chemical abbreviation, such as commonly found on a periodic table of elements. For example, hydrogen is represented by its common chemical abbreviation H; helium is represented by its common chemical abbreviation He; and so forth.

As used herein, the prefix "nano" refers to the nanometer scale (e.g., from about 1 nm to about 999 nm). For example, particles having an average diameter on the nanometer scale (e.g., from about 1 nm to about 999 nm) are referred to as "nanoparticles". Particles having an average diameter of greater than 1,000 nm (i.e., 1 μm) are generally referred to as "microparticles", since the micrometer scale generally involves those materials having an average size of greater than 1 μm.

As used herein, the term "polymer" generally includes, but is not limited to, homopolymers; copolymers, such as, for example, block, graft, random and alternating copolymers; and terpolymers; and blends and modifications thereof. Furthermore, unless otherwise specifically limited, the term "polymer" shall include all possible geometrical configurations of the material. These configurations include, but are not limited to isotactic, syndiotactic, and random symmetries.

The term "organic" is used herein to refer to a class of chemical compounds that are comprised of carbon atoms. For example, an "organic polymer" is a polymer that includes carbon atoms in the polymer backbone, but may also include other atoms either in the polymer backbone and/or in side chains extending from the polymer backbone (e.g., oxygen, nitrogen, sulfur, silicon, etc.).

The "number average molecular weight" ($M_n$) is readily calculated by one of ordinary skill in the art, and generally refers to the ordinary arithmetic mean or average of the molecular weights of the individual macromolecules. It is determined by measuring the molecular weight of n polymer molecules, summing the weights, and dividing by n, such as represented in the formula:

$$\overline{M}_n = \frac{\sum_i N_i M_i}{\sum_i N_i}$$

where $N_i$ is the number of molecules of molecular weight $M_i$. The number average molecular weight of a polymer can be determined by gel permeation chromatography and all colligative methods, like vapor pressure osmometry or end-group determination.

The "weight average molecular weight" ($M_w$) is readily calculated by one of ordinary skill in the art, and generally refers to:

$$\overline{M}_w = \frac{\sum_i N_i M_i^2}{\sum_i N_i M_i}$$

where $N_i$ is the number of molecules of molecular weight $M_i$. The weight average molecular weight can be determined by light scattering, small angle neutron scattering (SANS), X-ray scattering, gel permeation chromatography, and sedimentation velocity.

The polydispersity index (PDI) is a measure of the distribution of molecular mass in a given polymer sample. The PDI calculated is the weight average molecular weight divided by the number average molecular weight. It indicates the distribution of individual molecular masses in a batch of polymers. The PDI has a value equal to or greater than 1, but as the polymer chains approach uniform chain length, the PDI approaches unity (i.e., 1).

As used herein the grafting density (a) is stated in terms of chain density (chain/nm$^2$) calculated from the corresponding weight loss ratio determined by thermal gravimetric analysis (TGA), the number of grafting chains, and surface area of nanoparticles using:

$$\sigma = (wN_A/M_n)(4\pi\alpha^2 n) = a\rho z N_A \times 10^{-21}/3(1-z)M_n$$

where w is the weight of organic polymers, $N_A$ is Avogadro's number, n is the number of nanoparticles, and z is the weight loss of polymer chains. Grafting density can also be determined by UV-Vis spectroscopy methods.

DETAILED DESCRIPTION

Reference now will be made to the embodiments of the invention, one or more examples of which are set forth below. Each example is provided by way of an explanation of the invention, not as a limitation of the invention. In fact, it will be apparent to those skilled in the art that various modifications and variations can be made in the invention without departing from the scope or spirit of the invention. For instance, features illustrated or described as one embodiment can be used on another embodiment to yield still a further embodiment. Thus, it is intended that the present invention cover such modifications and variations as come within the scope of the appended claims and their equivalents. It is to be understood by one of ordinary skill in the art that the present discussion is a description of exemplary embodiments only, and is not intended as limiting the broader aspects of the present invention, which broader aspects are embodied exemplary constructions.

Methods are generally provided for conducting the surface-initiated RAFT polymerization of butadiene-derived monomers on nanoparticle surfaces (e.g., silica nanoparticles), which is tremendously important for industry applications. The resulting butadiene-derived polymer grafted nanoparticles can be more dispersible in a rubber matrix or in a polyolefin matrix, and can enhance the mechanic properties of the resulting composite polymeric materials.

To prepare butadiene-derived polymer grafted nanoparticles, the first step is to prepare RAFT agent anchored nanoparticles. In most embodiments, the RAFT agents employed must be selected to be stable at the polymerization temperature. For example, butadiene-derived monomers polymerized at relatively high reaction temperatures (e.g., above 100° C.) require RAFT agents configured to be stable at these reaction temperatures. Thus, a high temperature stable trithiocarbonate RAFT agent is utilized according to the presently described methods. For example, as shown in the exemplary embodiment of FIG. 1, 4-cyano-4-(dodecylsulfanylthiocarbonyl)sulfanylpentanoic acid (CDSS) was anchored on nanoparticles.

I. Nanoparticles:

The presently disclosed methods can be utilized on a variety of different types of nanoparticles. The nanoparticle may comprise, for example, natural or synthetic nanoclays (including those made from amorphous or structured clays), inorganic metal oxides (e.g., silica, alumina, and the like), nanolatexes, organic nanoparticles, etc. Particularly suitable nanoparticles include inorganic nanoparticles, such as silica, alumina, titania (TiO$_2$), indium tin oxide (ITO), CdSe, etc., or mixtures thereof. Suitable organic nanoparticles include polymer nanoparticles, carbon, graphite, graphene, carbon nanotubes, virus nanoparticles, etc., or mixtures thereof.

Nanoparticles, as used herein, means particles (including but not limited to rod-shaped particles, disc-shaped particles, platelet-shaped particles, tetrahedral-shaped particles), fibers, nanotubes, or any other materials having at least one dimension on the nano scale. In one embodiment, the nanoparticles have an average particle size of about 1 nanometer to about 1000 nanometers, preferably 2 nanometers to about 750 nanometers. That is, the nanoparticles have a dimension (e.g., an average diameter or length) of about 1 to 1000 nm. Nanotubes can include structures up to 1 centimeter long, alternatively with a particle size from about 2 to about 50 nanometers. Due to their size, nanoparticles have very high surface-to-volume ratios.

The nanoparticles may be crystalline or amorphous. A single type of nanoparticle may be used, or mixtures of different types of nanoparticles may be used. If a mixture of nanoparticles is used they may be homogeneously or non-homogeneously distributed in the composite material or a system or composition containing the composite material. Non-limiting examples of suitable particle size distributions of nanoparticles are those within the range of about 2 nm to less than about 750 nm, alternatively from about 2 nm to less than about 200 nm, and alternatively from about 2 nm to less than about 150 nm.

It should also be understood that certain particle size distributions may be useful to provide certain benefits, and other ranges of particle size distributions may be useful to provide other benefits (for instance, color enhancement requires a different particle size range than the other properties). The average particle size of a batch of nanoparticles may differ from the particle size distribution of those nanoparticles. For example, a layered synthetic silicate can have an average particle size of about 25 nanometers while its particle size distribution can generally vary between about 10 nm to about 40 nm.

In one embodiment, the nanoparticles can be exfoliated from a starting material to form the nanoparticles. Such starting material may have an average size of up to about 50 microns (50,000 nanometers). In another embodiment, the nanoparticles can be grown to the desired average particle size.

II. Attaching an Anchoring Compound to the Nanoparticle:

In certain embodiments, an anchoring compound can be attached to the surface of the nanoparticle for subsequent attachment of the polymeric chain (e.g., via a "grafting-from" or "grafting-to" approach, as described in greater detail below). The anchoring compound is covalently bonded to the surface of the nanoparticle, either directly or via a functionalization group.

The particular anchoring compound can be selected based upon the type of nanoparticle. Generally, the anchoring compound has a functional group for further reaction to the polymer chain.

Figure 1B:
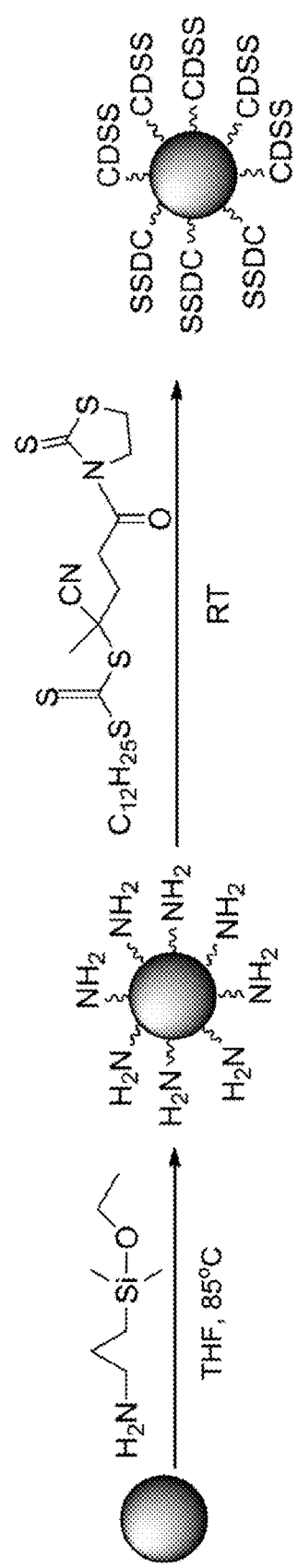
FIG. 1B shows a schematic illustration of an exemplary method of surface functionalization of nanoparticles with a trithiocarbonate RAFT agent for surface-initiated RAFT polymerization of isoprene.

For example, referring to the first reaction step shown in FIG. 1B, an anchoring compound having an amino-functionalization is shown attached to the surface of a nanoparticle (represented by the sphere). In one embodiment, the amino-functionalization of the nanoparticles (i.e., attachment of amine groups to the nanoparticles) can be achieved through reaction of the nanoparticles with a mono-functional silane anchoring compound (e.g., 3-aminopropyldimethylmethoxysilane or 3-aminopropyldimethylethoxysilane). Use of a mono-functional silane as the anchoring compound, such as 3-aminopropyldimethylmethoxysilane or 3-aminopropyldimethylethoxysilane, compared to a difunctional or trifunctional silanes ensures the formation of a monolayer of anchoring agent on the silica surface and helps to prevent particle agglomeration by crosslinking during processing. However, mono-functional, di-functional, and tri-functional silanes are all suitable for use as an anchoring compound in the presently disclosed methods.

No matter the particular silane (i.e., mono-functional, di-functional, or tri-functional, etc.), the ratio of the silane to the nanoparticles is critical in determining the grafting density. In addition to adjusting the ratio by varying the concentration of the mono-functional silane, addition of a small amount of an inert dimethylmethoxy-n-octylsilane can help to partially cover the nanoparticle surface by inert alkyl groups and to help tune the grafting density along with helping to prevent aggregation of the nanoparticles.

III. Attaching a Polymer Chain to the Anchoring Compound:

In a preferred embodiment, to prepare butadiene-derived polymer grafted nanoparticles, high temperature RAFT agents are employed for the polymerization of butadiene-derived monomers ascribed to the high reaction temperature (e.g., above 100° C.), since some other RAFT agents are not stable at such temperatures. Thus, a high temperature stable trithiocarbonate RAFT agent is utilized as an anchoring compound for attaching a butadiene-derived polymer chain to the nanoparticle. For example, 4-cyano-4-(dodecylsulfanylthiocarbonyl)sulfanylpentanoic acid (CDSS) can be attached to the surface of the nanoparticle through the anchoring compound, as shown in FIG. 1B, following activation. Other suitable high temperature RAFT agents can be utilized, including those RAFT agents in any of the RAFT classes (e.g., xanthates, dithiocarbamates, trithiocarbonates, and dithioesters) that are stable at the reaction temperature.

Referring to FIG. 1A, CDSS can be activated by reaction with 2-mercaptothiazoline to form activated CDSS (i.e., CDSS having its carboxylic acid functional group replaced with a 2-mercaptothiazoline-containing functional group). Then, the activated CDSS anchoring compound can be attached on the surface of the nanoparticles. Depending on the composition of the nanoparticle, its surface may be first functionalized with amine groups (e.g., as described above using a mono-functional silane such as 3-aminopropyldimethylethoxysilane) via attachment of an anchoring compound. Alternatively, a phosphorus linkage can be utilized between the surface of the nanoparticle and the RAFT agent, such as described in International Patent Publication No. WO 2013078309 A1 (serial no. PCT/US2012/066254) of Benicewicz, et al. titled "Silicone based nanocomposites including inorganic nanoparticles and their methods of manufacture and use," which is incorporated by reference herein.

To attach the RAFT agent onto the anchoring compound of the nanoparticle, the activated CDSS is immobilized onto the surface of the nanoparticle via a condensation reaction with the amine groups of the shown anchoring compound on the nanoparticle's surface. Using this approach, various CDSS-functionalized nanoparticles can be synthesized having a grafting density varying from 0.01-0.7 anchoring compounds/nm$^2$. An inherent advantage of this technique compared to the other "grafting-from" methods is the ease and accuracy in measuring the grafting density before carrying out the polymerization. The CDSS molecule is UV-VIS active and hence by comparing the absorption at 302 nm from the CDSS-functionalized nanoparticles to a standard absorption curve made from known amounts of free CDSS, the concentration of the anchoring compounds attached onto the nanoparticles can be calculated. Knowledge of the concentration of the anchoring compounds attached onto the nanoparticles before the reaction provides the reaction with control and predictability, which is the key to controlling molecular weight and molecular weight distribution.

Two methods can be utilized to form the butadiene-derived polymer chain extending from the nanoparticles via the anchoring compound: a "grafting-from" approach and a "grafting-to" approach. These strategies will be explained in more details in the following sections.

A. Monomers

The monomers for the presently disclosed methods generally include butadiene-derived monomers, which can be generally represented according to Formula 1 below:

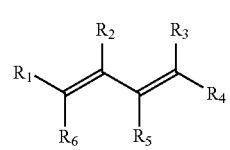

Formula 1 butadiene-derived monomer where $R_1$, $R_2$, $R_3$, $R_4$, $R_5$, and $R_6$ are, independently, H, an alkyl group (e.g., with a carbon chain of 1 to 6 carbons), a halogen (e.g., —Cl, —F, —Br, etc.), an aromatic group (e.g., a phenyl group), an hydroxyl group, an ether group (i.e., —O—R, with R being an organic group), or another suitable organic group.

For example, one particularly suitable monomer for the presently disclosed methods is butadiene, which is represented by Formula 1 where $R_1$, $R_2$, $R_3$, $R_4$, $R_5$, and $R_6$ are H as shown below in Formula 2:

Formula 2

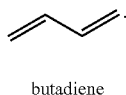

butadiene

Another particularly suitable monomer for the presently disclosed methods is isoprene, which is represented by Formula 1 where $R_1$, $R_3$, $R_4$, $R_5$, and $R_6$ are H and $R_2$ is a methyl group as shown below in Formula 3:

Formula 3

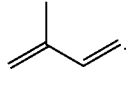

isoprene

Yet another suitable monomer for the presently disclosed methods is chloroprene, which is represented by Formula 1 where $R_1$, $R_3$, $R_4$, $R_5$, and $R_6$ are H and $R_2$ is a chlorine group as shown below in Formula 4:

Formula 4

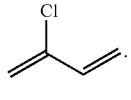

chloroprene

Still another suitable monomer for the presently disclosed methods is 1,1,2-trichlorobutadiene, which is represented by Formula 1 where $R_3$, $R_4$, and $R_5$, are H and $R_1$, $R_2$, and $R_6$ are a chlorine group as shown below in Formula 5:

Formula 5

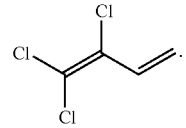

1,1,2-trichlorobutadiene

Another suitable monomer for the presently disclosed methods is 2,3-dimethylbutadiene, which is represented by Formula 1 where $R_1$, $R_3$, $R_4$, and $R_6$, are H and $R_2$ and $R_5$ are a methyl group as shown below in Formula 6:

Formula 6

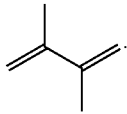

2,3-dimethylbutadiene

Still another suitable monomer for the presently disclosed methods is 1,3-pentadiene, which is represented by Formula 1 where $R_1$, $R_2$, $R_3$, $R_5$, and $R_6$, are H and $R_4$ is a methyl group as shown below in Formula 7:

Formula 7

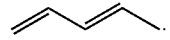

1,3-pentadiene

Yet another suitable monomer for the presently disclosed methods is 2-acetoxy butadiene, which is represented by Formula 1 where $R_1$, $R_3$, $R_4$, $R_5$, and $R_6$, are H and $R_2$ is a acetoxy group as shown below in Formula 7:

Formula 8

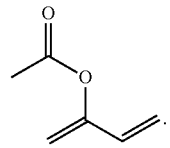

2-acetoxy butadiene

Other suitable butadiene-derived monomers may be utilized, as desired.

It is noted that the hydrogen atoms in Formulas 2-8 are not shown, according to normal practice in the art of organic chemistry.

B. "Grafting-From" Methods

In one embodiment, the butadiene-derived polymer chain can be formed by polymerizing a plurality of monomers on the anchored RAFT agent attached to the anchoring compound on the surface of the nanoparticle, with the plurality of monomers comprising at least one of the butadiene-derived monomers described above. This polymerization results in the butadiene-derived polymer chain being covalently bonded to the surface of the nanoparticle via the anchoring compound.

The particular types of monomer(s) and/or polymerization technique can be selected based upon the desired polymeric chain to be formed. For example, for RAFT polymerization, butadiene-derived monomers can be polymerized either alone (i.e., substantially free from any other types of monomers) or in combination with a co-monomer.

Thus, the "grafting-from" method involves formation of the butadiene-derived polymer chain onto the anchoring compound and results in the butadiene-derived polymer polymeric chain being covalently bonded to the nanoparticle via the anchoring compound (and, if present, a first functionalization compound).

C. "Grafting-To" Methods

Alternatively, the polymeric chain can be first polymerized and subsequently covalently bonded to the surface of the nanoparticle, either directly or via a anchoring compound (and, if present, a functionalization compound). Thus, in this embodiment, the polymeric chain has been polymerized prior to attachment to the anchoring compound.

In this embodiment, the polymeric chain is not limited to the type of polymerization and/or types of monomer(s) capable of being polymerized directly to the anchoring compound. As such, as long as the polymeric chain defines a functional group that can react and bond to the anchoring compound, any polymeric chain can be bonded to the nanoparticle.

For example, when polymerized utilizing a RAFT agent, then a reactive end group of the polymer chain (i.e., the RAFT agent group) can react/attach to the anchoring compound.

IV. Reversible Addition-Fragmentation Chain Transfer Polymerization

Reversible Addition-Fragmentation chain Transfer polymerization (RAFT) is one type of controlled radical polymerization. RAFT polymerization uses thiocarbonylthio compounds, such as dithioesters, dithiocarbamates, trithiocarbonates, and xanthates, in order to mediate the polymerization via a reversible chain-transfer process. RAFT polymerization can be performed by simply adding a chosen quantity of appropriate RAFT agents (thiocarbonylthio compounds) to a conventional free radical polymerization.

Typically, a RAFT polymerization system includes the monomer, an initiator, and a RAFT agent (also referred to as a chain transfer agent). Because of the low concentration of the RAFT agent in the system, the concentration of the initiator is usually lower than in conventional radical polymerization. Suitable radical initiators can be azobisisobutyronitrile (AIBN), 4,4'-azobis(4-cyanovaleric acid) (ACVA), etc.

RAFT agents are generally thiocarbonylthio compounds, such as generally shown in Formula 9 below:

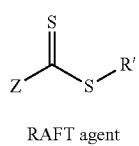

Formula 9

RAFT agent where the Z group primarily stabilizes radical species added to the C═S bond and the R' group is a good homolytic leaving group which is able to initiate monomers. For example, the Z group can be an alkyl group, an aryl group (e.g., phenyl group, benzyl group, etc.), a thiol group (e.g., R—S—, with R being H or any suitable organic group, such as alkyl, aryl, etc), an amine group (e.g., $R_2N$—, with each R group being independently H or any suitable organic group, such as alkyl, aryl, etc), an oxy group (R—O—, with R being any suitable organic group, such as alkyl, aryl, etc), etc. The R' group can be an organic chain terminating with a carboxylic acid group, a carboxylic derivative, an alkyne group, an azide group, an alcohol group, an alkene group, or another group that is reactive with the functional group of the particular anchoring compound attached to the nanoparticle. That is, in one particular embodiment, the functional group of the anchoring compound present on the nanoparticle is reactive with the R' group of the RAFT agent to ensure sufficient covalent bonding therebetween.

As stated, RAFT is a type of living polymerization involving a conventional radical polymerization in the presence of a reversible chain transfer reagent. Like other living radical polymerizations, there is minimized termination step in the RAFT process. The reaction is started by radical initiators (e.g., AIBN). In this initiation step, the initiator reacts with a monomer unit to create a radical species which starts an active polymerizing chain. Then, the active chain reacts with the thiocarbonylthio compound, which kicks out the homolytic leaving group (R'). This is a reversible step, with an intermediate species capable of losing either the leaving group (R') or the active species. The leaving group radical then reacts with another monomer species, starting another active polymer chain. This active chain is then able to go through the addition-fragmentation or equilibration steps. The equilibration keeps the majority of the active propagating species into the dormant thiocarbonyl compound, limiting the possibility of chain termination. Thus, active polymer chains are in equilibrium between the active and dormant species. While one polymer chain is in the dormant stage (bound to the thiocarbonyl compound), the other is active in polymerization.

By controlling the concentration of initiator and thiocarbonylthio compound and/or the ratio of monomer to thiocarbonylthio compound, the molecular weight of the polymeric chains can be controlled with low polydispersities.

Depending on the target molecular weight of final polymers, the monomer to RAFT agent ratios can range from about less than about 10 to more than about 20,000 (e.g., about 5,000 to about 15,000). Other reaction parameters can be varied to control the molecular weight of the final polymers, such as solvent selection, reaction temperature, and reaction time. For instance, solvents can include conventional organic solvents such as tetrahydrofuran, toluene, dimethylformamide, anisole, acetonitrile, dichloromethane, etc.

The reaction temperature can range from about 60° C. to about 140° C. (e.g., about 100° C. to about 120° C.). However, since most of the butadiene-derived monomers have boiling points within or below these reaction temperatures, in certain embodiments, the pressure of the reaction vessel can be increased to keep the butadiene-derived monomer in a liquid state (even at the reaction temperature). For example, the reaction pressure can be up to about 2000 PSI, such as about 25 PSI to about 500 PSI (e.g., about 50 PSI to about 250 PSI). The reaction time can be from less than about 1 h to about 72 h.

The RAFT process allows the synthesis of polymers with specific macromolecular architectures such as block, gradient, statistical, comb/brush, star, hyperbranched, and network copolymers.

Because RAFT polymerization is a form of living radical polymerization, it is ideal for synthesis of block copolymers. For example, in the copolymerization of two monomers (A and B) allowing A to polymerize via RAFT will exhaust the monomer in solution with significantly suppressed termination. After monomer A is fully reacted, the addition of monomer B will result in a block copolymer. One requirement for maintaining a narrow polydispersity in this type of copolymer is to have a chain transfer agent with a high transfer constant to the subsequent monomer (monomer B in the example).

Using a multifunctional RAFT agent can result in the formation of a star copolymer. RAFT differs from other forms of CLPs because the core of the copolymer can be introduced by functionalization of either the R group or the Z group. While utilizing the R group results in similar structures found using ATRP or NMP, the use of the Z group makes RAFT unique. When the Z group is used, the reactive polymeric arms are detached from the core while they grow and react back into the core for the chain-transfer reaction.

V. Deactivating the Butadiene-Derived Polymer Chain:

No matter the method used to attach the polymeric chain to anchoring compound on the nanoparticle, upon attachment, the polymeric chain is, in one particular embodiment, deactivated to prevent further polymerization thereon.

For example, if the "grafting-from" method was utilized to attach the polymeric chain to the anchoring compound via polymerization through a CRP technique (e.g., RAFT), a deactivation agent can be attached to, or reacted with, the end of each polymeric chain to inhibit further polymerization thereon. The deactivation agents can be selected based upon the type of polymerization and/or the type(s) of monomers utilized, but can generally include but are not limited to amines, peroxides, or mixtures thereof.

On the other hand, if the "grafting-to" method was utilized to attach the polymeric chain to the anchoring compound via attaching a pre-formed polymeric chain, the polymeric chain can be deactivated after or before covalently bonding the polymeric chain to the anchoring compound. Alternatively, the polymeric chain can be deactivated prior to covalently bonding the polymeric chain to the anchoring compound.

The deactivation of the polymeric chain can be achieved by any suitable process. In one embodiment, the polymer chain can be cleaved. Alternatively, the end of the polymer chain can be deactivated. For example, when formed via RAFT polymerization, the types of reactions that can be used to convert RAFT agents to deactivated end groups include reactions with diazo compounds, reactions with nucleophilic reagents such as primary amines, and reactions with oxidation agents which cleave the RAFT agent off the chain end and form an oxidized sulfur group such as sulfonic acid.

VI. Additional Polymeric Chains

If desired, in particular embodiments, a second set of polymeric chains can be grafted to the surface of the nanoparticles, as set forth in U.S. Patent Publication No. 2013/0041112 of Benicewicz, et al. titled "Nanoparticles with Multiple Attached Polymer Assemblies and Use Thereof in Polymer Composites," which is incorporated by reference herein.

VII. Polymer Functionalized Nanoparticles

Through these methods, a polymer functionalized nanoparticle is formed that has a polymeric chain covalently bonded to the surface of the nanoparticle, with the polymeric chain comprising a butadiene-derived polymer chain.

Depending on the properties desired in the resulting grafted nanoparticle, the butadiene-derived polymer chain can be relatively short (e.g., about 10 to about 100 repeating monomers) or relatively long (e.g., about 300 to about 3000 repeating monomers). Additionally, the PDI of the butadiene-derived polymer chain can be substantially low (e.g., about 1.1 to about 1.3) or can be substantially high (e.g., greater than about 1.4)

VII. Polymeric Nanocomposites

Finally, the butadiene-derived polymer grafted nanoparticles can be mixed with a polymeric matrix and further processed into a nanocomposite. The polymeric materials may include, but are not limited to, polyolefins (e.g., polyethylene, polypropylene, etc.), polymeric rubber materials (e.g., natural rubber, butadiene based rubbers, nitrile rubbers (e.g., NBR), styrene-butadiene rubber (SBR), ethylene-propylene-diene monomer (EPDM) materials, butyl rubber, etc.), polychloroprenes, polynorbornenes, etc, or mixtures thereof.

Mixing can be accomplished by simple mixing of the components when at least one of the components is a liquid, or by dissolving the components in a solvent for the components and removing the solvent at a later time. Mixing can also be accomplished without a solvent, such as via melt mixing methods.

The butadiene-derived polymer grafted nanoparticles can be loaded within matrix in a relatively high amount, if desired, such as about 25 wt. % to 60 wt. % (e.g., about 35 wt. % to about 50 wt. %) of the total weight of the resulting nanocomposite. Such loading can be, in one embodiment, with substantially uniform dispersion of the nanoparticles within the polymer matrix. Alternatively, the butadiene-derived polymer grafted nanoparticles can be loaded within the polymer matrix at a relatively low loading, such as greater than 0 to about 5 wt. % of the total weight of the resulting nanocomposite.

EXAMPLES

CDSS was activated by 2-mercaptothiazoline to form activated CDSS with a yield of 71.3%. 3-aminopropyldimethylethoxysilane (1.6 mL) was added to $SiO_2$ nanoparticles (10 g solution, 30 wt %) dispersed in dry THF (40 mL). The reaction mixture was stirred at 75° C. overnight under $N_2$ protection. The solution was precipitated into hexane (400 mL), centrifuged at 3000 rpm for 5 minutes, and then redispersed in dry THF. The solution was precipitated again into hexane and redispersed in dry THF for further use.

The above amino-functionalized nanoparticles were added slowly to a THF solution of activated CDSS and the resulting solution was stirred at RT overnight. After the reaction, the solution was precipitated into cyclohexane and ethyl ether mixture (200 mL, cyclohexane:ethyl ether=4:1), centrifuged at 3000 rpm for 5 minutes, redispersed in dry DMF. The solution was precipitated again into ethyl ether and redispersed in dry DMF. This procedure was repeated several times until the supernatant solution was colorless after centrifugation. The final nanoparticles were dispersed in dry DMF for further usage and an aliquot of the nanoparticles was subjected to UV-vis analysis to determine the graft densities of the coated CDSS on the particle surface.

Figure 2:
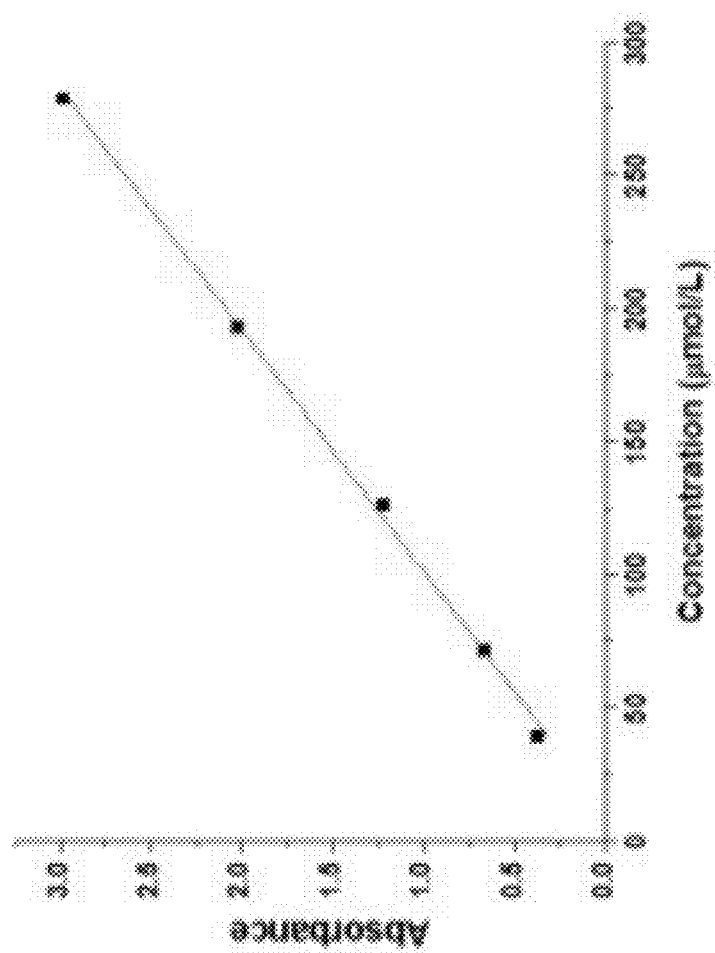
FIG. 2 shows a UV-vis standard absorption curve of CDSS.

The amount of CDSS covalently bound to the nanoparticle surface (0.17 chains/$nm^2$, 0.24 chains/$nm^2$, 0.35 chains/$nm^2$, 0.61 chains/$nm^2$) was determined quantitatively by comparing the absorbance for the CDSS modified particles to a standard UV-vis absorption curve prepared from known amounts of free CDSS at 299 nm (FIG. 2).

Bulk Polymerization of Isoprene

Example 1

The bulk RAFT polymerization of isoprene was conducted in a sealed tube in a 115° C. oil bath with a ratio between species of [isoprene]:[CDSS]:[Initiator]=1082:1:0.2. The molecular weight ($M_n$) of the free polyisoprene chains after 39 hr was 18168 g/mol and the PDI was 1.35 as measured by gel permeation chromatography (GPC) which was calibrated with polymethylmethacrylate standards. The conversion was 35.4% and the theoretical molecular weight was 26814 g/mol.

Example 2

This reaction was performed in a sealed tube in a 120° C. oil bath with the ratio between species of [isoprene]:[CDSS]:[Initiator]=1000:1:0.2. The molecular weight ($M_n$) of the free polyisoprene chains after 49 hr was 24000 g/mol and the PDI was 1.24 as measured by gel permeation chromatography (GPC) which was calibrated with polystyrene standards. The conversion was 38% and the theoretical molecular weight was 25840 g/mol.

Surface-Initiated RAFT Polymerization of Isoprene

Example 1

The surface-initiated RAFT polymerization of isoprene was conducted in 1.2 mL DMF at 115° C. with a ratio between species of [isoprene]:[CDSS]:[Initiator]=348:1:0.14 using nanoparticles with chain density of 0.24 chain/nm². The molecular weight ($M_n$) of the anchored polyisoprene chains was 35907 g/mol and the PDI was 1.21 as measured by gel permeation chromatography (GPC) which was calibrated with polymethylmethacrylate standards.

Example 2

The surface-initiated RAFT polymerization of isoprene was conducted in a sealed tube with 1.5 mL THF in a 120° C. oil bath with a ratio between species of [isoprene]:[CDSS]:[Initiator]=4000:1:0.2 using nanoparticles with chain density of 0.39 chain/nm². The molecular weight (Mn) of the anchored polyisoprene chains was 38000 g/mol and the PDI was 1.49 as measured by gel permeation chromatography (GPC) which was calibrated with polystyrene standards.

Example 3

The surface-initiated RAFT polymerization of isoprene was conducted in 1 mL 4-methyl-2-pentanone as the solvent in a sealed tube in a 120° C. oil bath with a ratio between species of [isoprene]:[CDSS]:[Initiator]=4000:1:0.2 using nanoparticles with chain density of 0.17 chain/nm². The molecular weight ($M_n$) of the anchored polyisoprene chains was 24000 g/mol and the PDI was 1.65 as measured by gel permeation chromatography (GPC) which was calibrated with polystyrene standards.

Typical Procedure of Bulk RAFT Polymerization of Isoprene:

Isoprene (0.5 mL, 5.0 mmol), CDSS (4.04 mg, 10.0 µmol) and dicumyl peroxide initiator (0.54 mg, 2.0 µmol) were added to a Schlenk tube. The mixture was degassed by four freeze-pump-thaw cycles, filled with nitrogen, and then the sealed tube was placed in an oil bath of 115° C. for 39 h. The polymerization was stopped by quenching in ice water.

Typical Procedure of Surface-Initiated RAFT Polymerization of Isoprene on Nanoparticles:

Isoprene (0.15 mL, 0.102 g), CDSS anchored nanoparticles (3.0 µmol, 52.65 mg), dry DMF (1.2 ml) and dicumyl peroxide initiator (0.16 mg) were added to a Schlenk tube. The mixture was degassed by four freeze-pump-thaw cycles, filled with nitrogen, and then the sealed tube was placed in an oil bath of 115° C. for 20 h. The polymerization was stopped by quenching in ice water.

These and other modifications and variations to the present invention may be practiced by those of ordinary skill in the art, without departing from the spirit and scope of the present invention, which is more particularly set forth in the appended claims. In addition, it should be understood the aspects of the various embodiments may be interchanged both in whole or in part. Furthermore, those of ordinary skill in the art will appreciate that the foregoing description is by way of example only, and is not intended to limit the invention so further described in the appended claims.

What is claimed:

1. A method of synthesizing a polymer functionalized nanoparticle, the method comprising:
   attaching an anchoring compound to a nanoparticle;
   attaching a RAFT agent to the anchoring compound; and
   polymerizing a plurality of monomers on the anchoring compound to form a polymeric chain covalently bonded to the nanoparticle via the anchoring compound, wherein the plurality of monomers comprise butadiene-derived monomers.

2. The method as in claim 1, further comprising:
   thereafter, deactivating the polymeric chain.

3. The method as in claim 1, wherein polymerization is performed at a reaction temperature of about 60° C. to about 140° C., and wherein polymerization is achieved via RAFT polymerization.

4. The method as in claim 1, wherein the butadiene-derived monomers have the structure:

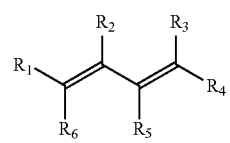

where $R_1$, $R_2$, $R_3$, $R_4$, $R_5$, and $R_6$ are, independently, H, an alkyl group, a halogen, an aromatic group, an hydroxyl group, an ether group, or another suitable organic group.

5. The method as in claim 1, wherein the butadiene-derived monomers comprise butadiene, isoprene, chloroprene, 1,1,2-trichlorobutadiene, 2,3-dimethylbutadiene, 1,3-pentadiene, 2-acetoxy butadiene, or mixtures thereof.

6. The method as in claim 1, wherein the plurality of monomers further comprises co-monomers.

7. The method as in claim 1, wherein the butadiene-derived monomers comprises isoprene.

8. The method as in claim 1, wherein the nanoparticle comprises an inorganic nanoparticle.

9. The method as in claim 8, wherein the inorganic nanoparticle comprises silica, alumina, titania, indium tin oxide, CdSe, or mixtures thereof.

10. The method as in claim 1, wherein the nanoparticle comprises an organic nanoparticle, and wherein the organic nanoparticle comprise polymer nanoparticles, carbon, graphite, graphene, carbon nanotubes, virus nanoparticles, or mixtures thereof.

11. The method as in claim 1, wherein the anchoring compound is covalently bonded to the surface of the nanoparticle directly.

12. The method as in claim 1, wherein the anchoring compound is covalently bonded to the surface of the nanoparticle via a functionalization group.

13. The method as in claim 12, wherein the functionalized group comprises an amine functional group.

14. The method as in claim 1, wherein the anchoring compound has a functional group.

15. The method as in claim 14, wherein the functional group of the anchoring compound comprises an amine group.

16. The method as in claim 1, wherein the RAFT agent comprises an activated CDSS.

17. The method as in claim 16, further comprising:
   prior to attaching the RAFT agent to the anchoring compound, reacting 4-cyano-4-(dodecylsulfanylthiocarbonyl)sulfanylpentanoic acid with 2-mercaptothiazoline to form activated CDSS.

18. The method as in claim 1, wherein the polymer functionalized nanoparticle has a grafting density varying from 0.01-0.7 anchoring compounds/nm².

19. The method as in claim 1, wherein polymerization is performed at a reaction pressure that is sufficient to keep a majority of the plurality of monomer in the liquid state.

* * * * *